No. 822,228. PATENTED MAY 29, 1906.
W. W. WILLIAMS.
WIRE CHOKER TRAP.
APPLICATION FILED AUG. 18, 1905.
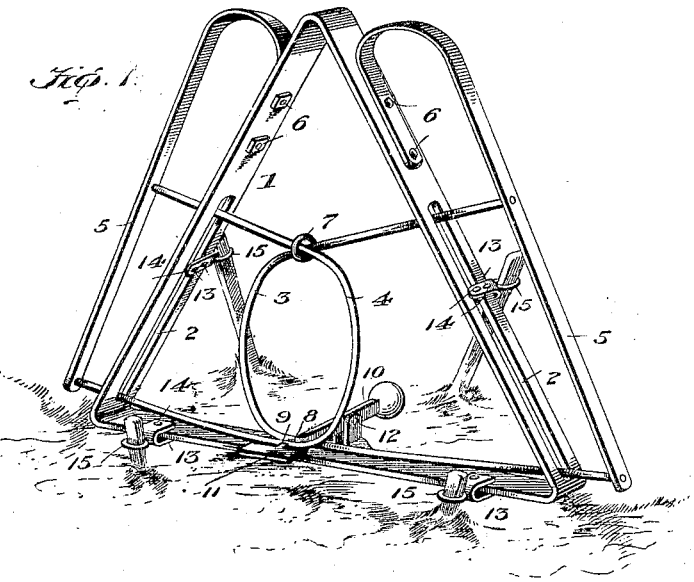
Fig. 1.
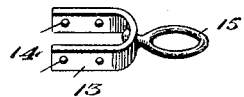
Fig. 2.
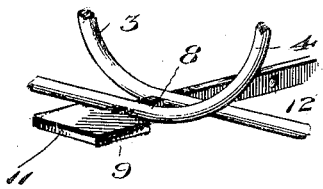
Fig. 3.
Walter W. Williams
Inventor
Witnesses
Sarah V. Lockwood
By
Henry N. Copp
Attorney
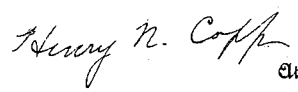

UNITED STATES PATENT OFFICE.

WALTER W. WILLIAMS, OF LITTLEFORK, MINNESOTA.

WIRE CHOKER-TRAP.

No. 822,228.  Specification of Letters Patent.  Patented May 29, 1906.

Application filed August 18, 1905. Serial No. 274,745.

*To all whom it may concern:*

Be it known that I, WALTER W. WILLIAMS, a citizen of the United States, residing at Littlefork, county of Itasca, and State of Minnesota, have invented certain new and useful Improvements in Wire Choker-Traps, of which the following is a specification.

This invention relates to wire choker-traps.

My object is to provide a trap of the wire choker type which will be inexpensive to make, strong, light, durable, and extremely sensitive, and adapted to be positioned anywhere and secured to the ground for use in catching small animals of all kinds.

The invention embodies certain improved features and novel combinations of parts set forth in detail hereinafter.

In the accompanying drawings, Figure 1 is a perspective view of my improved trap secured in position and set, parts of the frame being broken away; Fig. 2, a detail of one of the swivel-rings for the securing-stakes, and Fig. 3 a detail of the pan and portions of the choker-wires engageable therewith.

The frame 1 is of metal, preferably in one piece and triangular in shape, the sides of which have slots 2 for the free play of the wire chokers 3 and 4, each having its ends secured to the free portion of a bowed leaf-spring 5, said springs being secured to the sides of frame 1 at 6 and tending to draw the chokers 3 and 4 in opposite directions. To prevent separation of the chokers 3 and 4 and to insure their proper relation to each other, a ring 7 loosely encircles them where they cross. The wire chokers are sufficiently thick, so that the notches 8 and 9 therein do not weaken them. Said notches are adapted to receive and engage the stem or lever 10 of the pan 11, said lever being pivoted at 12 to the top of the lower part of frame 1. When the lever 10 is engaged with the notches 8 and 9, the trap is set, the chokers forming a loop to catch the animal, and the springs 5 are under tension.

To enable the trap to be secured at any desired place where the game is to be trapped, I provide on the sides and bottom of the frame clips 13, secured by fastenings passed through openings 14 and eyes 15, swiveled to the clips 13. Stakes 16 are passed through the eyes 15 and driven in the ground to thereby secure the frame 1 in the desired upright position suitable for catching the game.

The trap having been set by engaging lever 10 with the notches 8 and 9 and the bait being applied, when the animal steps on or touches the pan 11 the lever 10 is released from the notches 8 and 9 and the springs 5 instantly draw the chokers 3 and 4 in opposite directions, which thereupon encircle the neck or body of the animal back of its front legs and kill it.

Having thus described my invention, what I claim as new, and desire to secure by Letters Patent, is—

1. In a choker-trap, the combination with a frame, of oppositely-acting springs secured to said frame, looped chokers each having both ends secured to one of the springs and each constituting an endless loop and adapted to operate in opposite directions when released, and a pan or trigger for releasably locking the chokers in set or retracted position.

2. In a choker-trap, the combination with a frame, of oppositely-acting springs secured to said frame, looped chokers secured to the respective springs and adapted to operate in opposite directions when released, said chokers having notches, and a pan or trigger for releasably engaging the notches aforesaid to lock the chokers in set or retracted position.

3. In a choker-trap, the combination with a frame, of oppositely-acting springs secured to said frame, looped chokers secured to the respective springs and adapted to operate in opposite directions when released, a ring loosely encircling crossed portions of said chokers, and a pan or trigger for releasably locking the chokers in set or retracted position.

4. In a choker-trap, the combination with a frame, having slots in its side, of oppositely-acting springs secured to said frame, independent looped wire chokers secured to the respective springs and passing loosely through the respective slots aforesaid and adapted to operate in opposite directions when released, and a pan or trigger for releasably locking the chokers in set retracted position.

5. In a trap, the combination with a frame having upright portions, of trapping mechanism carried by said frame, and swiveled eyes on the upright portions of said frame adapted to receive stakes for fastening the frame in upright position.

6. In a trap, the combination with a frame having a base or horizontal member, of trapping mechanism carried by said frame, and swiveled eyes extending horizontally from the base or horizontal member aforesaid whose openings extend vertically and are adapted to receive upright stakes for fastening the frame in upright position.

In testimony whereof I hereunto affix my signature in presence of two witnesses.

WALTER W. WILLIAMS.

Witnesses:
N. L. OLSON,
HOWARD W. MERCER.